United States Patent
Musale et al.

(10) Patent No.: US 9,328,003 B2
(45) Date of Patent: *May 3, 2016

(54) METHOD OF HEAVY METAL REMOVAL FROM WATER STREAMS

(71) Applicant: Nalco Company, Naperville, IL (US)

(72) Inventors: Deepak A. Musale, Aurora, IL (US); Daniel E. Schwarz, Naperville, IL (US); Paul J. Zinn, Oswego, IL (US); Bruce A. Keiser, Plainfield, IL (US); Jitendra T. Shah, Naperville, IL (US)

(73) Assignee: Nalco Company, Naperville, IL (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/076,488

(22) Filed: Nov. 11, 2013

(65) Prior Publication Data

US 2014/0061130 A1    Mar. 6, 2014

Related U.S. Application Data

(63) Continuation-in-part of application No. 12/107,108, filed on Apr. 22, 2008, now abandoned, and a continuation-in-part of application No. 11/516,843, filed on Sep. 7, 2006, now abandoned, and a continuation-in-part of application No. 11/695,819, filed on Apr. 3, 2007, now abandoned, and a continuation-in-part of application No. 13/366,441, filed on Feb. 6, 2012, now Pat. No. 8,585,994, and a continuation-in-part of application No. 12/754,683, filed on Apr. 6, 2010, now Pat. No. 8,211,389, and a continuation-in-part of application No. 11/952,637, filed on Dec. 7, 2007, now Pat. No. 8,110,163.

(51) Int. Cl.
| | |
|---|---|
| C01F 1/00 | (2006.01) |
| C02F 1/56 | (2006.01) |
| B01D 61/58 | (2006.01) |
| B01D 61/02 | (2006.01) |
| B01D 61/14 | (2006.01) |
| C02F 1/38 | (2006.01) |
| C02F 1/44 | (2006.01) |
| C02F 1/66 | (2006.01) |
| C02F 1/68 | (2006.01) |
| C02F 11/12 | (2006.01) |
| C02F 101/20 | (2006.01) |
| C02F 103/16 | (2006.01) |
| C02F 103/18 | (2006.01) |
| C02F 103/34 | (2006.01) |

(52) U.S. Cl.
CPC . *C02F 1/56* (2013.01); *B01D 61/58* (2013.01); *B01D 61/025* (2013.01); *B01D 61/027* (2013.01); *B01D 61/145* (2013.01); *B01D 61/147* (2013.01); *B01D 2311/04* (2013.01); *B01D 2317/025* (2013.01); *B01D 2317/08* (2013.01); *B01D 2321/04* (2013.01); *C02F 1/385* (2013.01); *C02F 1/441* (2013.01); *C02F 1/444* (2013.01); *C02F 1/66* (2013.01); *C02F 1/683* (2013.01); *C02F 11/12* (2013.01); *C02F 2101/20* (2013.01); *C02F 2103/16* (2013.01); *C02F 2103/18* (2013.01); *C02F 2103/346* (2013.01)

(58) Field of Classification Search
None
See application file for complete search history.

(56) References Cited

U.S. PATENT DOCUMENTS

| | | | |
|---|---|---|---|
| 3,310,174 | A | 3/1967 | Hornbostel |
| 4,039,446 | A | 8/1977 | Ban et al. |
| 4,147,745 | A | 4/1979 | Sano et al. |
| 4,435,548 | A | 3/1984 | Tomalia et al. |
| 4,451,351 | A | 5/1984 | Porter et al. |
| 4,578,195 | A | 3/1986 | Moore et al. |
| 4,670,180 | A | 6/1987 | Moriya et al. |
| 4,731,187 | A | 3/1988 | Moriya et al. |
| 5,164,095 | A | 11/1992 | Sparapany et al. |
| 5,275,628 | A | 1/1994 | Dimas et al. |
| 5,294,339 | A | 3/1994 | Jorgens |
| 5,346,627 | A | 9/1994 | Siefert et al. |
| 5,395,896 | A | 3/1995 | Moriya et al. |
| 5,500,133 | A | 3/1996 | Carey et al. |
| 5,510,040 | A | 4/1996 | Miller et al. |
| 5,523,002 | A | 6/1996 | Carey et al. |
| 5,658,487 | A | 8/1997 | Carey et al. |
| 5,766,478 | A | 6/1998 | Smith et al. |

(Continued)

FOREIGN PATENT DOCUMENTS

| | | |
|---|---|---|
| AU | 634504 B2 | 2/1993 |
| EP | 0506132 A1 | 9/1992 |

(Continued)

OTHER PUBLICATIONS

Alvarez et al., "Thermal and Mechanical Properties of Halogen-Containing Aromatic Polymaides," *Macromol. Chem. Phys.*, 16, pp. 3142-3148 (2001).

Benson et al., "Pilot- and Full-Scale Demonstration of Advanced Mercury Control Technologies for Lignite-Fired Power Plants," Final Report, pp. 1-78 (Feb. 2005).

Blythe et al., "Bench-scale Kinetics Study of Mercury Reactions in FGD Liquors: Semiannual Technical Progress Report," DOE/NETL, 36. pp. (Apr. 1, 2006-Sep. 30, 2006).

(Continued)

*Primary Examiner* — Steven Bos
(74) *Attorney, Agent, or Firm* — Leydig, Voit & Mayer, Ltd.

(57) ABSTRACT

The invention provides methods and compositions for separating metals from a liquid medium, the method uses a copolymer derived from at least two monomers: acrylic-x and an alkylamine, wherein said polymer is modified to contain a functional group capable of scavenging one or more compositions containing one or more metals are disclosed. The treated liquid is then passed through a filtration system. The scavenging effect of the combination of the treatment with the filtration is unexpectedly greater than the sum of its parts.

16 Claims, 2 Drawing Sheets

(56) References Cited

U.S. PATENT DOCUMENTS

| | | | |
|---|---|---|---|
| 5,854,173 A | 12/1998 | Chang et al. | |
| 6,177,017 B1 | 1/2001 | Ward | |
| 6,258,277 B1 | 7/2001 | Salmen et al. | |
| 6,365,116 B1 | 4/2002 | Barham et al. | |
| 6,398,039 B1 | 6/2002 | Xue et al. | |
| 6,403,726 B1 | 6/2002 | Ward | |
| 6,416,668 B1 | 7/2002 | Al-Samadi | |
| 6,521,021 B1 | 2/2003 | Pennline et al. | |
| 6,527,828 B2 | 3/2003 | Flippo et al. | |
| 6,590,051 B1 | 7/2003 | Carter et al. | |
| 6,667,384 B2 | 12/2003 | Gu et al. | |
| 6,808,692 B2 | 10/2004 | Oehr | |
| 6,818,043 B1 | 11/2004 | Chang et al. | |
| 6,878,358 B2 | 4/2005 | Vosteen et al. | |
| 6,896,800 B2 | 5/2005 | Yamasaki et al. | |
| 6,953,494 B2 | 10/2005 | Nelson, Jr. | |
| 7,473,303 B1 | 1/2009 | Higgins et al. | |
| 7,713,503 B2 | 5/2010 | Maly et al. | |
| 7,776,780 B1 | 8/2010 | Granite et al. | |
| 8,110,163 B2 | 2/2012 | Keiser et al. | |
| 8,142,548 B2 | 3/2012 | Higgins et al. | |
| 8,211,389 B2 * | 7/2012 | Zinn | B01D 53/64 210/732 |
| 2001/0047956 A1 | 12/2001 | Albiston et al. | |
| 2003/0104969 A1 | 6/2003 | Caswell et al. | |
| 2003/0110948 A1 | 6/2003 | Gaita et al. | |
| 2004/0045437 A1 | 3/2004 | Chang et al. | |
| 2004/0168980 A1 | 9/2004 | Musale et al. | |
| 2004/0178149 A1 | 9/2004 | Hernandez et al. | |
| 2004/0188339 A1 | 9/2004 | Murkute et al. | |
| 2005/0000901 A1 | 1/2005 | Campbell et al. | |
| 2005/0040108 A1 | 2/2005 | Jay | |
| 2005/0043493 A1 | 2/2005 | Smith et al. | |
| 2005/0147549 A1 | 7/2005 | Lissianski et al. | |
| 2007/0056706 A1 | 3/2007 | Crisp et al. | |
| 2007/0248512 A1 | 10/2007 | Kawawa et al. | |
| 2008/0060999 A1 | 3/2008 | Musale et al. | |
| 2008/0202396 A1 | 8/2008 | Aradi et al. | |
| 2011/0245453 A1 | 10/2011 | Zinn et al. | |

FOREIGN PATENT DOCUMENTS

| | | | |
|---|---|---|---|
| JP | 57-091785 A | 6/1982 | |
| JP | 08-173936 A | 7/1996 | |
| JP | 08-243559 A | 9/1996 | |
| JP | 2000-015222 A | 1/2000 | |
| JP | 2000015222 A | 1/2000 | |
| JP | 2000-063794 A | 2/2000 | |
| JP | 2000-117270 A | 4/2000 | |
| JP | 2002-320979 A | 11/2002 | |
| KR | 10-0139830 B1 | 3/1998 | |
| MY | 142047 A | 8/2010 | |

OTHER PUBLICATIONS

Byrne, *Reverse Osmosis*, 2nd ed., Tall Oaks Publishing, Littleton, CO, p. 81 (2002).

Cotton et al., *Advanced Inorganic Chemistry*, 6th ed., John Wiley & Sons, Inc., p. 598. (1999).

Depriest et al., "Economics of Lime and Limestone for Control of Sulfur," pp. 1-25 (May 2003).

Depriest et al., "Wet Flue Gas Desulfurization Technology Evaluation," National Lime Assoc., 50 pp. (Jan. 2003).

Edison Electrical Institute, "Mercury Control Technologies for Coal-Based Power Plants," 2 pp. (Aug. 2005).

Glater et al., "The Search for a Chlorine-Resistant Reverse Osmosis Membrane," *Desalination*, 95, pp. 325-345 (1994).

Higgins et al., "Flue Gas Desulfurization Wastewater Treatment Primer," *Power*, 153, 16 pp. (2009).

Higgins et al., "Flue Gas Desulfurization Wastewater Treatment: Lessons Learned," *Coal Gen. Conference*, pp. 1-17, (2007).

Kang et al., "Preparation and Properties of Aromatic Polyamide Homologs Containing Chlorine Substituents," *J. of App. Polymer Sci.*, 77, pp. 1387-1392 (2000).

King, *Encyclopedia of Inorganic Chemistry*, vol. 4, John Wiley & Sons, Inc., pp. 2136-2137 (1997).

Koros et al., "Terminology for Membranes and Membrane Processes," *J. of Membrane Sci.*, 120, pp. 149-159 (1996).

McCubbin et al., "Dithiocarbamate-Functionalized Dendrimers as Ligands for Metal Complexes," Inorg. Chem., 37(15), pp. 3753-3758 (1998).

Miller et al., "Mercury Capture and Fate using Wet FGD at Coal-Fired Power Plants," *DOE/NETL Mercury and Wet FGD R&D*, pp. 1-37 (Aug. 2006).

Mugnier et al., Optimisation of a Back-Flush Sequence for Zeolite Microfiltration, *J. of Membrane Sci.*, 175, pp. 149-161 (2000).

Othmer, *Encyclopedia of Polymer Science and Engineering*, 2nd ed., vol. 17, pp. 75-104 (1989).

* cited by examiner

METHOD OF HEAVY METAL REMOVAL FROM WATER STREAMS

CROSS-REFERENCE TO RELATED APPLICATIONS

This application is a continuation in part of co-pending U.S. patent application Ser. No. 12/107,108 filed on Apr. 22, 2008 which is also a continuation in part of co-pending U.S. patent application Ser. No. 11/516,843 filed on Sep. 7, 2006.

This application is also a continuation in part of co-pending U.S. patent application Ser. No. 11/695,819 filed on Apr. 3, 2007 which is also a continuation in part of co-pending U.S. patent application Ser. No. 11/516,843 filed on Sep. 7, 2006.

This application is also a continuation in part of co-pending U.S. patent application Ser. No. 13/366,441 filed on Feb. 6, 2012 which in turn is a continuation in part application of U.S. patent application Ser. No. 12/754,683 filed on Apr. 6, 2010 and issued as U.S. Pat. No. 8,211,389 and which is also a continuation in part of U.S. patent application Ser. No. 11/952,637 which was filed Dec. 7, 2007 and which issued as U.S. Pat. No. 8,110,163.

STATEMENT REGARDING FEDERALLY SPONSORED RESEARCH OR DEVELOPMENT

Not applicable.

BACKGROUND OF THE INVENTION

The invention relates to compositions, methods, and apparatuses for removing mercury and other heavy metals from industrial wastewater via the use of a filtration system and other separation systems. Due to stringent environmental regulations and/or water shortage, industries have to remove heavy metals from their wastewaters before discharge or reuse. Most of the wastewaters are treated by commodity dithiocarbamate (DTC) and/or (TTC) trithiocarbonate chemistries or specialty polymeric DTC compounds and then the precipitated metals are separated in a clarifier. In recent years, ultrafiltration (UF) or microfiltration (MF) membranes are increasingly being used for solid-liquid separation instead of clarifier, as UF/MF membrane processes are much compact and result in water with very high quality (almost no suspended solids and negligible turbidity). The UF or MF permeate can be reused with or without any further treatment, depending on purpose of reuse. More importantly, membrane filtration allows further higher metal removal to meet stringent metal discharge limits in the ppb (parts per billion) or ppt (parts per trillion) concentration range. As a result there is a clear need for and utility in novel compositions, methods, and apparatuses for removing mercury and other heavy metals from industrial wastewater via the use of a filtration system.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of removing one or more metals from a medium containing said metals. The method comprises the steps of: (a) treating said medium containing metals with a composition comprising a copolymer derived from at least two monomers: acrylic-x and an alkylamine, and (b) passing the treated medium through a filter, and (c) collecting said metals;

wherein said acrylic-x has the following formula:

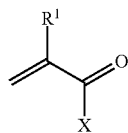

wherein X is OH and salts thereof or $NHR^2$ and wherein $R^1$ and $R^2$ is H or an alkyl or an group, wherein the molecular weight of said polymer is between 500 to 200,000, and wherein said polymer is modified to contain a functional group capable of scavenging said medium containing one or more metals.

The filter may be selected from the group consisting of: a sand filter, paper, ultrafiltration, nanofiltration, microfiltration, reverse flow filtration, submerged membrane filtration, reverse osmosis, and any combination thereof. The functional group may be a dithiocarbamate salt group. The polymer may have between 5 to 100 mole % of said dithiocarbamate salt group.

The acrylic-x is acrylic acid or salts thereof and the alkylamine may be pentaethylenehexamine or tetraethylenepetamine or diethylenetriamine or triethylenetetraamine or ethylenediamine. The molar ratio between acrylic-x and alkylamine may be from 0.85 to 1.5. The molecular weight of the polymer may be from 1,500 to 8,000 Daltons. The polymer may be modified to contain more than 20 mole percent dithiocarbamic acid or salts thereof. The acrylic-x is acrylamide and the alkylamine may be pentaethylenehexamine or tetraethylenepetamine or diethylenetriamine or triethylenetetraamine or ethylenediamine, and the molar ratio between acrylic-x and alkylamine may be from 0.85 to 1.5; and the molecular weight of the polymer may be from 1,500 to 8,000; and the polymer may be modified to contain more than 20 mole percent dithiocarbamic acid or salts thereof.

The medium may be a process stream containing water. The metals may be selected from the group consisting of: copper, nickel, zinc, lead, mercury, cadmium, silver, iron, manganese, palladium, platinum, strontium, selenium, arsenic, cobalt, gold, and any combination thereof. The method may also comprise an additional treatment of the process stream with a complexing amount of a water soluble ethylene dichloride ammonia polymer having a molecular weight of from 500 to 100,000 which contains 5 to 80 mole % of dithiocarbamate salt groups to form a complex of these metals.

The polymer treatment may occur at a temperature at or below or above 300° C. The copolymer may further comprise a fluorescent group. The medium may be treated with oxidant first before treatment with scavenging polymer. The medium may be pH adjusted first before treatment with scavenging polymer. The medium may be treated with another coagulant before or after treatment with scavenging polymer.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
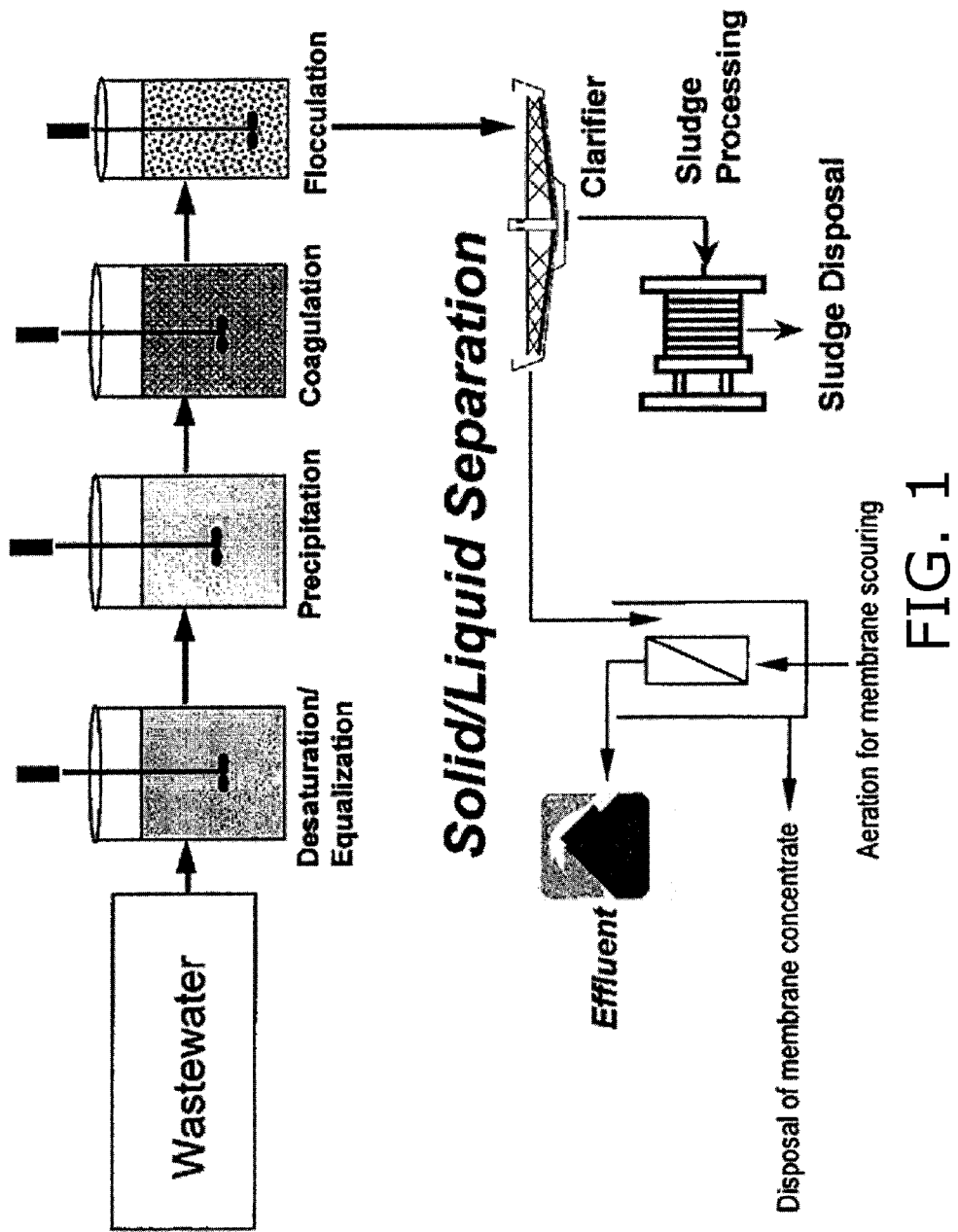
FIG. 1 is an illustration of wastewater being treated according to at least one embodiment of the invention.

The following definitions are provided to determine how terms used in this application, and in particular how the claims, are to be construed. The organization of the definitions is for convenience only and is not intended to limit any of the definitions to any particular category.

"ACXA" means acrylic-x-alkylamine copolymer

"DAF" means Dissolved Air Floatation unit.

"FGD" means Flue Gas Desulfurization.

"PES" means Polyether Sulfone.

"PDTC" means poly dithiocarbamate which includes all forms of polymers which have dithiocarbamate functional groups present.

"DTC" means dithiocarbamate.

"TTC" means trithiocarbonate.

"PTTC" means poly trithiocarbonate which includes all forms of polymers which have trithiocarbonate functional groups present.

"Thiocarbamate Material" means a composition of matter that contains a DTC or TTC functional group, it includes but is not limited to DTC, TTC, PTTC, PDTC, and any combination thereof.

"Consisting Essentially of" means that the methods and compositions may include additional steps, components, ingredients or the like, but only if the additional steps, components and/or ingredients do not materially alter the basic and novel characteristics of the claimed methods and compositions.

"Filter" means a structure constructed and arranged to remove suspended materials from within a liquid that is passed through it.

"Membrane" means a structure having lateral dimensions much greater than its thickness though which a mass transfer may occur, membranes may be used to filter liquids.

"Submerged Membrane" means a membrane positioned entirely beneath the surface layer of a liquid and which effects mass transfer of materials suspended within the liquid it is submerged within.

"MF" means microfiltration, a membrane based separation process in which particles and dissolved macromolecules larger than 0.1 µm do not pass through the membrane, MF may be pressure driven.

"NF" means nanofiltration, a membrane based separation process in which particles and dissolved macromolecules larger than 1 nm do not pass through the membrane, NF may be pressure driven.

"UF" means ultrafiltration, a membrane based separation process in which particles and dissolved macromolecules smaller than 0.1 µm and larger than 2 nm do not pass through the membrane, UF may be pressure driven.

"RO" means reverse osmosis a water purification technology that uses a hydrostatic force (a thermodynamic parameter) to overcome osmotic pressure (a colligative property) in the water to remove one or more unwanted items from the water, RO may be a membrane based separation process, wherein the osmotic pressure is overcome by the hydrostatic force, it may be driven by chemical potential, RO may be pressure driven, RO can remove many types of molecules and ions from solutions and is used in both industrial processes and in producing potable water, in a pressurized RO process the solute is retained on the pressurized side of the membrane and the pure solvent is allowed to pass to the other side, to be "selective," an RO membrane may be sized to not allow large molecules or ions through the pores (holes), and often only allows smaller components of the solution (such as the solvent) to pass freely, in some cases dissolved molecules larger than 0.5 nm do not pass through membrane.

"Effective amount" means a dosage of any additive that affords an increase in one of the three quantiles when compared to an undosed control sample.

"Consisting Essentially of" means that the methods and compositions may include additional steps, components, ingredients or the like, but only if the additional steps, components and/or ingredients do not materially alter the basic and novel characteristics of the claimed methods and compositions.

"ppt" means parts per trillion

"Chelant Scavengers" means compounds that are capable of complexing with chelants. These scavengers are usually, but are not limited to, the salt form.

"Polymeric Chelant" means a polymeric molecule that reacts and/or complexes with heavy metals.

"Amphoteric Polymer" means a polymer derived from both cationic monomers and anionic monomers, and, possibly, other non-ionic monomer(s). Amphoteric polymers can have a net positive or negative charge. The amphoteric polymer may also be derived from zwitterionic monomers and cationic or anionic monomers and possibly nonionic monomers. The amphoteric polymer is water soluble.

"Cationic Polymer" means a polymer having an overall positive charge. The cationic polymers of this invention are prepared by polymerizing one or more cationic monomers, by copolymerizing one or more nonionic monomers and one or more cationic monomers, by condensing epichlorohydrin and a diamine or polyamine or condensing ethylenedichloride and ammonia or formaldehyde and an amine salt. The cationic polymer is water soluble.

"Zwitteronic Polymer" means a polymer composed from zwitterionic monomers and, possibly, other non-ionic monomer(s). In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer. The zwitterionic polymer is water-soluble. "Anionic polymer" means a polymer having an overall negative charge. The anionic polymers of this invention are prepared by polymerizing one or more anionic monomers or by copolymerizing one or more non-ionic monomers and one or more anionic monomers. The anionic polymer is water-soluble.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer*

*Encyclopedia of Chemical Technology*, 5th Edition, (2005), (Published by Wiley, John & Sons, Inc.) this definition shall control how the term is to be defined in the claims.

At least one embodiment of the invention is directed towards removing metal from a sample of water comprising the steps of treating the water with a scavenger polymer then passing the water through a filter. As demonstrated in the Examples section, the combination of the scavenging polymer with the filter results in an unexpected synergistic effect which is greater than the sum of its parts.

Without being limited by a particular theory or design of the invention or of the scope afforded in construing the claims, it is believed that when a scavenging polymer interacts with metals to form complexes, the size of the resulting agglomerated complex structures may have a wide size distribution. Use of the polymer alone will result in the formation of some complex structures that are so small that they would not migrate into easy to remove phase layer and would remain in the water if not for the use of a filter. The use of a filter without the polymer however would be largely ineffective as the dissolved metals would freely pass through the filter.

By combining the filter with polymer treatment however both large and small polymer-metal complex particles can be removed including small complex particles that would otherwise not be removable. In at least one embodiment the time between the contact with the polymer and passage through a filter is so short that a discrete phase separation does not occur. This time may be one or more of: 1-30, 1-2, 2-3, 3-4, 4-5, 5-6, 6-7, 7-8, 8-9, 9-10, 10-11, 11-12, 12-13, 13-14, 14-15, 15-16, 16-17, 17-18, 18-19, 19-20, 20-21, 21-22, 22-23, 23-24, 24-25, 25-26, 26-27, 27-28, 28-29, and/or 29-30 minutes, and any combination thereof. In at least one embodiment the conditions governing the contact are such that substantially (or essentially entirely) only fine sized complex particles form and as a result they are only removable because the filter is sized to remove those smaller complex particles.

In at least one embodiment the scavenger polymer is one of those described in one or more of U.S. Pat. No. 8,211,389, and US Published Patent Applications 2012/0178864, 2013/0131253, and 2012/0177555. In at least one embodiment the scavenger polymer is a copolymer constructed from acrylic-x monomers and alkylamine monomers. The acrylic-x monomer is according to the formula:

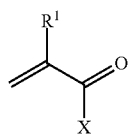

wherein X=OR, OH and salts thereof, or NHR2, wherein R is independently selected from an alkyl group, an aryl group, and an alkene group; and wherein R1 and R2 are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging at least one metal in a medium.

In at least one embodiment the alkylamine has a range of carbon atoms from 2 to 14, and a range of nitrogen atoms from 2 to 8.

In at least one embodiment R has a range of carbon atoms from 1 to 24.

In at least one embodiment R1 has a range of carbon atoms from 1 to 24.

In at least one embodiment R2 has a range of carbon atoms from 1 to 24.

In at least one embodiment the conjugated double bonds comprise at least 10% of the chemical bonds of the polymer backbone. In other embodiments, the conjugated double bonds comprise at least 20% of the chemical bonds of the polymer backbone.

The molecular weight of the polymer backbone can vary according to various considerations. For example, the target species and/or application for the polymers may be considered. Another consideration can be monomer selection. While molecular weight can be measured and/or calculated by various means, the molecular weight measurements of this disclosure were performed by size exclusion chromatography.

When molecular weight is mentioned in the application, it is referring to the molecular weight for the unmodified polymer, otherwise referred to as the polymer backbone. The functional groups that are added to the polymer backbone are not part of the calculation unless expressly stated. Thus, the molecular weight of the polymer including functional groups can far exceed any recited molecular weight range.

In certain embodiments, the molecular weight of the polymer backbone is from 1,000 to 16,000 Daltons, or higher.

In certain embodiments, the molecular weight of the polymer backbone is from 1,500 to 8,000 Daltons, or higher.

In at least one embodiment the functional group is attached to the polymer backbone is capable of binding to one or more metals, wherein the term "metals" includes metal-comprising compounds. Additionally, the term "a functional group" is used to denote that one or any number of functional groups may be attached to the polymer backbone. More than one functional group may be attached to the polymer backbone, but a single functional group would be within the scope of the disclosure.

In at least one embodiment the functional group comprises at least one sulfide compound.

In at least one embodiment the functional group is a dithiocarbamate salt group.

In at least one embodiment the metal-scavenging polymer is part of a composition. In certain embodiments, the composition may further comprise water.

In at least one embodiment the composition may further comprise a quantity of the medium comprising the at least one metal.

In at least one embodiment the composition may further comprise at least one metal selected from the group consisting of: copper, nickel, zinc, lead, mercury, cadmium, silver, iron, manganese, palladium, platinum, strontium, selenium, arsenic, cobalt, gold, and any combination thereof.

In at least one embodiment the composition may further comprise water soluble ethylene dichloride ammonia polymer having a polymer backbone with a molecular weight of from 500 to 100,000 Daltons, which is functionalized from 5 to 80 mole percent with dithiocarbamate salt groups. The diothiocarbamate is the functional group that results from reaction of the unfunctionalized polymer with carbon disulfide.

In at least one embodiment the functional groups of the metal-scavenging polymer are at least one of the following: alkylene phosphate groups, alkylene carboxylic acids and salts thereof, oxime groups, amidooxime groups, dithiocarbamic acids and salts thereof, hydroxamic acids, and nitrogen oxides.

The functionalization, i.e., the molar amounts of the functional group relative to the total amines of the polymer backbone, can vary as well. For example, the reaction of 3 molar equivalents of carbon disulfide to a 1:1 mole ratio acrylic acid/tetraethylene pentamine copolymer ("TEPA"), which comprises 4 molar equivalents of amines per repeat unit after polymerization, will result in a polymer that is functionalized 75 percent, i.e., has dithiocarbamate salt group attached to the polymer backbone at 75 percent of the total possible bonding sites. In other words, 75 percent of the total amines in the polymer backbone have been converted to dithiocarbamate salt groups.

In certain embodiments, the metal-scavenging polymer is between 5 to 100 percent functionalized with dithiocarbamate salt groups. In other embodiments, the polymer is between 25 to 90 percent functionalized with dithiocarbamate salt groups. In yet other embodiments, the polymer is between 55 to 80 percent functionalized with dithiocarbamate salt groups.

As previously discussed, the metal-scavenging polymer disclosed herein contains a polymer backbone derived from at least two monomers: acrylic-x and an alkylamine. The alkylamines may vary in kind.

In at least one embodiment the alkylamine is at least one of the following: an ethyleneamine, a polyethylenepolyamine, ethylenediamine ("EDA"), diethylenetriamine ("DETA"), triethylenetetraamine ("TETA"), tetraethylenepentamine ("TEPA"), and pentaethylenehexamine ("PEHA").

The acrylic-x monomer group can vary as well.

In at least one embodiment the acrylic-x is at least one of the following: methyl acrylate, methyl methacrylate, ethyl acrylate, and ethyl methacrylate, propyl acrylate, and propyl methacrylate.

In at least one embodiment the acrylic-x is at least one of the following: acrylic acid and salts thereof, methacrylic acid and salts thereof, acrylamide, and methacrylamide. The molar ratio between monomers that make up the fluorescing metal-scavenging polymer can vary. More specifically, the relative amounts of acrylic-x and alkylamine can vary and may depend upon the resultant polymer product that is desired. The molar ratio used is defined as the moles of acrylic-x divided by the moles of alkylamine.

In at least one embodiment the molar ratio between acrylic-x and alkylamine is from 0.85 to 1.5.

In at least one embodiment the molar ratio between acrylic-x and alkylamine is from 1.0 to 1.2.

In at least one embodiment the acrylic-x is an acrylic ester and the alkylamine is selected from the group consisting of PEHA, TEPA, DETA, TETA, EDA, and any combination thereof. In at least one embodiment the molar ratio between acrylic-x and alkylamine is from 0.85 to 1.5. In yet other embodiments, the molecular weight of the polymer backbone can encompass ranges: 500 to 200,000, 1,000 to 16,000, or 1,500 to 8,000. In at least one embodiment the acrylic ester can be at least one of the following: methyl acrylate, methyl methacrylate, ethyl acrylate, and ethyl methacrylate, propyl acrylate, and propyl methacrylate, which is combined with at least one alkylamine, which may include PEHA, TEPA, DETA, TETA, or EDA. In other embodiments, the resulting polymer is functionalized to comprise the following ranges of dithiocarbamate salt groups: 5 to 100 percent functionalization, 25 to 90 percent functionalization, 55 to 80 percent functionalization.

In at least one embodiment the acrylic-x is acrylamide and the alkylamine is selected from the group consisting of: TEPA, DETA, TETA, and EDA. In other embodiments, the molar ratio between acrylic-x and alkylamine is from 0.85 to 1.5. In yet other embodiments, the molecular weight of the fluorescing metal-scavenging polymer can encompass ranges: 500 to 200,000, 1,000 to 16,000, or 1,500 to 8,000 Daltons. In yet other embodiments, the acrylic amide can be at least one of acrylamide and methacrylamide, which is combined with at least one of the alkylamines, which may include at least one of the following: PEHA, TEPA, DETA, TETA, EDA. In other embodiments, the resulting polymer is functionalized to comprise the following ranges of dithiocarbamate salt groups: 5 to 100 percent functionalization, 25 to 90 percent functionalization, 55 to 80 percent functionalization, or at least 55 percent functionalization.

In at least one embodiment the functional group of the fluorescing metal-scavenging polymer is a dithiocarbamate salt group and the polymer is between 5 and 100 percent functionalized with the dithiocarbamate salt group based upon the total possible functionalization of the polymer backbone.

In at least one embodiment the acrylic-x is an acrylic acid or salts thereof and the alkylamine is selected from the group consisting of: PEHA, TEPA, DETA, TETA, EDA, and any combination thereof. In other embodiments, the molar ratio between acrylic-x and alkylamine is from 0.85 to 1.5. In yet other embodiments, the molecular weight of the polymer backbone can encompass ranges: 500 to 200,000, 1,000 to 16,000, or 1,500 to 8,000 Daltons. In other embodiments, the acrylic acid can be at least one of acrylic acid or salts thereof and methacrylic acid or salts thereof, which is combined with at least one of the alklyamines, which may include TEPA, DETA, TETA, or EDA. In yet other embodiments, the resulting polymer is functionalized to comprise the following ranges of dithiocarbamate salt groups: 5 to 100 percent functionalization, 25 to 90 percent functionalization, 55 to 80 percent functionalization, or at least 55 percent functionalization.

In addition to acrylic-x and alkylamine, other monomers may be integrated into the polymer backbone. A condensation polymer reaction scheme can be utilized to prepare the polymer backbone. Various synthesis methods can be utilized to functionalize the polymer with, for example, dithiocarbamate and/or other non-metal-scavenging functional groups. Also, the fluorescing metal-scavenging polymer of the present disclosure can be functionalized with other small molecule sulfide precipitants such as sodium sulfide, sodium hydrosulfide, TMT-15® (sodium or calcium salts of trimercapto-S-triazine; Evonik Industries Corporation 17211 Camberwell Green Lane, Houston, Tex. 77070, USA), dimethyldithiocarbamate and diethyldithiocarbamate.

In certain embodiments, the polymer backbone comprises fluorescing poly(acrylic-x/alkylamine). Embodiments of non- and lesser-fluorescing poly(acrylic-x/alkylamine) polymer backbones are defined in the parent applications (U.S. patent application Ser. No. 12/754,660, filed Apr. 6, 2010, and U.S. patent application Ser. No. 12/754,683, filed Apr. 6, 2010). The polymer backbones of the present disclosure can be polymerized at temperatures greater than that disclosed in the parent applications, e.g., above 160° C. during polymerization/dehydration, which creates polymer backbones that fluoresce more intensely. The polymer of the present disclosure is functionalized by chemically attaching at least one metal-scavenging functional group to the polymer backbones.

While not wishing to be bound to a particular theory, elevated temperatures employed during the preparation of the polymer backbone of the present disclosure are believed to drive a secondary, higher energy condensation/dehydration reaction during the condensation polymerization, consequently resulting in an increased amount of the fluorophore that is responsible for the strong light-absorbing and fluorescing properties of the polymers described herein. A potential chemical reaction sequence is proposed below. The increased amount of fluorophore in the polymer backbone of the present disclosure is believed to be a result of an increased formation of conjugated double bonds via the secondary, higher energy condensation/dehydration reaction. A method of synthesizing a scavenger polymer and of the proposed fluorophore mechanism and structure is shown below:

umns, strippers, and any combination thereof. In at least one embodiment the filter includes one or more of the filtration techniques disclosed in paper *Terminology for Membranes and Membrane Processes*, by W J Koros et al., Journal of Membrane Science, Vol. 120 pp. 149-159 (1996). In at least one embodiment the filter comprises any one or more of the chemical separation processes described on the website: http://encyclopedia.che.engin.umich.edu/Pages/Separation-sChemical/SeparationsChemical.html (as accessed on Oct. 17, 2013) and/or any one or more of the mechanical processes described on the website: http://encyclopedia.che.engin.u-mich.edu/Pages/SeparationsMechanical/SeparationsMe-chanical.html (as accessed on Oct. 17, 2013). Membrane filter may be made of polymeric, ceramic, steel or glass materials.

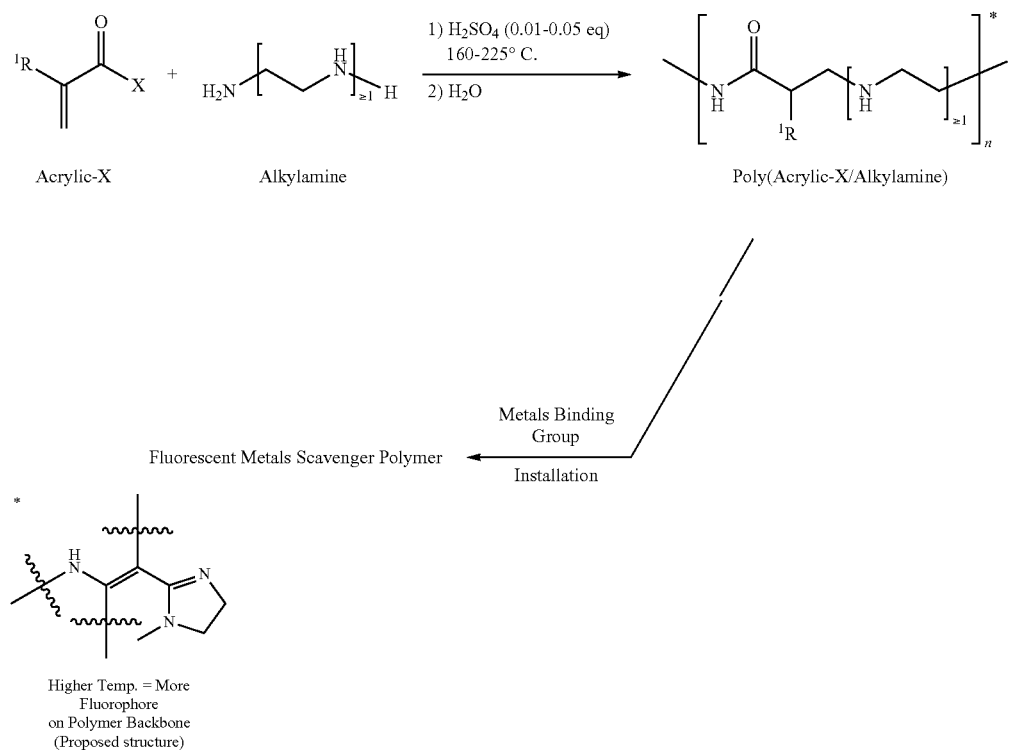

The metal to be scavenged includes but is not limited to zero valent, monovalent, and multivalent metals. The at least one metal may or may not be ligated by organic or inorganic compounds. Also, the at least one metal can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt, gold, and combinations thereof.

Figure 2:
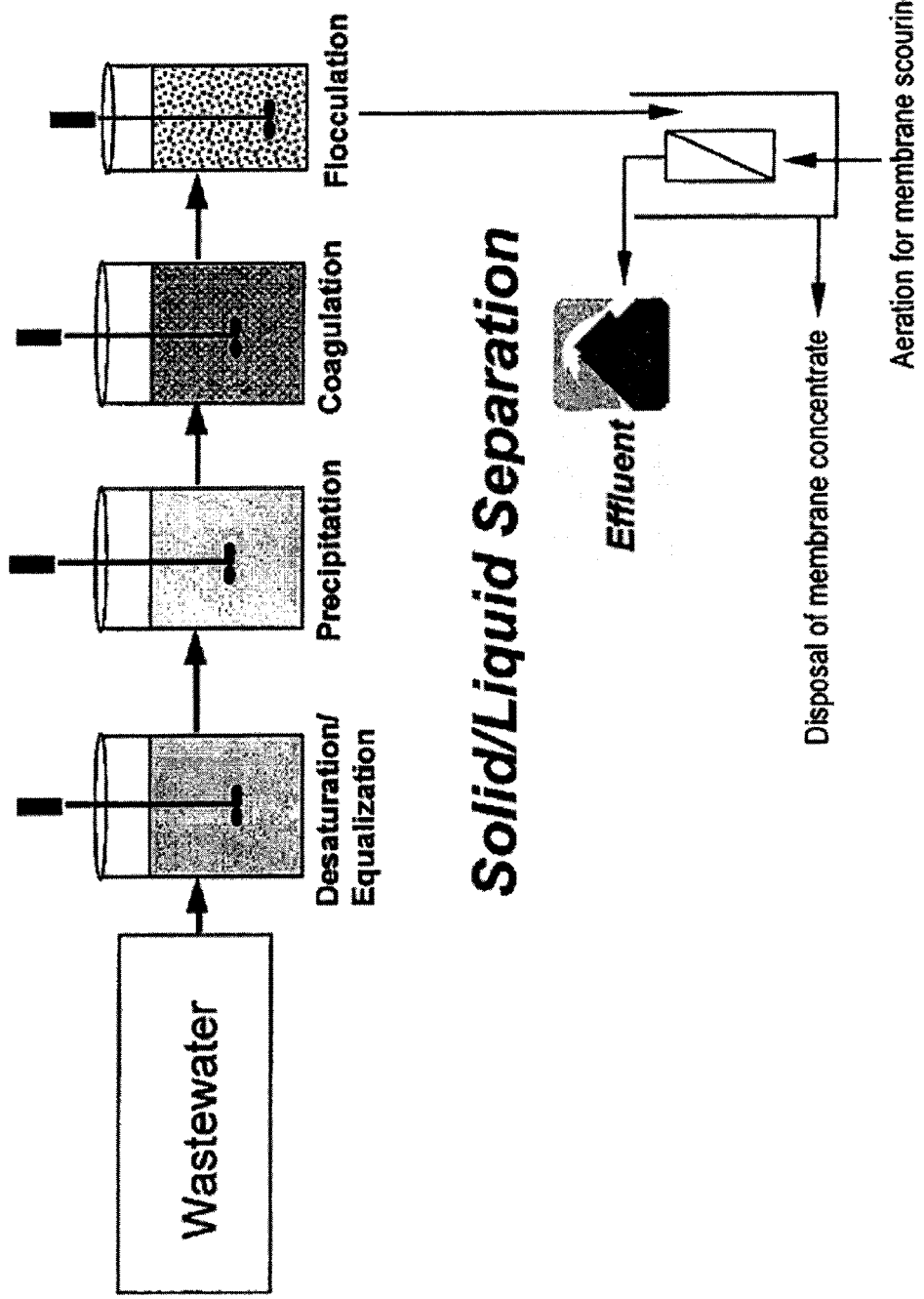
FIG. 2 is an illustration of wastewater being treated according to at least one embodiment of the invention.

The filter may be any structure constructed and arranged to remove suspended material from a liquid carrier medium. Representative examples include but are not limited to sand filters, filter paper, membrane filters, RO, NF, UF, MF, submerged filters, pressure filters, centrifuges, cyclones, hydrocyclones, electrostatic precipitators, gravity separators, mist eliminators, screeners, steam traps, absorbers, adsorbers, biofilters, crystallizers, dehumidifiers, distillation columns, dryers, evaporators, extractors, humidifiers, ion exchange col- FIG. 1 and FIG. 2 both illustrate embodiments in which the medium passes through a submerged filter at some point after being treated by the copolymer. It is understood that the illustration discloses any form of filtration technique in which in addition to or instead of this submerged filter any one or more additional methods of filtration may be employed. Similarly it is understood that while FIG. 1 and FIG. 2 illustrate various portions of the polymer treatment and filtration steps being conducted in separate vessels, any one, some or all of these portions can be conducted within the same one vessel. In particular in at least one embodiment the filter is a submerged filter which is submerged within the very same vessel within which the scavenger polymer treats the liquid medium. In at least one embodiment the polymer treatment and the filtration (submerged or otherwise) occur in the same vessel at the same time. In at least one embodiment, scavenging polymer may be added inline instead of in reaction tank, before filtration. In at least one embodiment, metal containing water treated with scavenging polymer/s may be clarified first and supernatant then filtered through filter. In another embodiment, metal containing water treated with scavenging polymer/s may be filtered directly.

In at least one embodiment the scavenging polymer containing composition may also comprise other material useful in scavenging metals and/or with other polymers including but not limited to: those disclosed in U.S. Pat. No. 5,164,095, a water soluble ethylene dichloride ammonia polymer having a molecular weight of from 500 to 100,000 which is functionalized from 5 to 50 percent with dithiocarbamate salt groups. In certain embodiments, the molecular weight of the polymer backbone of the water soluble ethylene dichloride ammonia polymer is from 1500 to 5000 Daltons and is functionalized from 5 to 80 mole percent with dithiocarbamate salt groups. In other embodiments, the molecular weight of the polymer backbone of the water soluble ethylene dichloride ammonia polymer is from 1500 to 5000 and is functionalized from 25 to 40 percent with dithiocarbamate salt groups.

In at least one embodiment the scavenging polymer containing composition may also comprise one or more materials and/or methods useful in enhancing the effectiveness of one or more sorts of filters. Such include but are not limited to those described in U.S. Pat. Nos. 5,346,627, and 6,258,277 and US Published Patent Applications 2008/0060999, 2008/0060997, and 2008/0197075.

In at least one embodiment the scavenging polymer is applied to the water in the same vessel that a submerged filter is within.

As will be shown in the examples below, combining the scavenging polymer with a filter results in an unexpected synergy which exceeds the effect of the sum of either alone.

Examples

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of experiments were performed with simulated and actual industrial wastewater samples involving treatment with the acrylic-x-alkylamine copolymer followed by UF or MF membranes. The results demonstrated that it produced higher metal removal than just by settling after acrylic-x-alkylamine copolymer treatment, due to fine colloidal metal-acrylic-x-alkylamine copolymer complex removal by membrane barrier. In these experiments, the PDTC used was a carbon disulfide modified ethylene dichloride ammonia polymer and the ACXA used was a carbon disulfide modified acrylic acid tetraethylenepentamine polymer.

Table 1 and Table 2 show effect of acrylic-x-alkylamine copolymer (ACXA) dosage on Ni removal from DAF effluent from grain processing facility. A 0.45 um syringe filter was used as a representative for filtration. A UF membrane (100 kDa molecular weight Cut-off) was also tested directly on raw wastewater, which showed that acrylic-x-alkylamine copolymer pretreatment was critical for metal removal and filtration alone does not remove significant metal. Table 1 also shows results with dithiocarbamate polymer (PDTC) treatment for comparison. It is seen (comparing Sample #4 with #5) that 30 ppm acrylic-x-alkylamine copolymer (ACXA) was equally effective or better than 400 ppm dithiocarbamate polymer for this particular wastewater. All of the samples except for the control, #9 and #14 had 2 ppm acrylic acid-acrylamide copolymer flocculant mixed in as well. Sample 9 was left to settle overnight.

TABLE 1

Ni removal results from grain processing facility waste water

| Sample # | pH adjusted to | Scavenger (ppm) | Mixing min | Filtration | Residual Ni (ppb) | % Ni Removal |
| --- | --- | --- | --- | --- | --- | --- |
| Control | — | — | * | — | 80 | 0 |
| 1 | — | 50 PDTC | 30 | 0.45 μm syringe | 45 | 44 |
| 2 | — | 100 PDTC | 30 | 0.45 μm syringe | 45 | 44 |
| 3 | — | 200 PDTC | 30 | 0.45 μm syringe | 40 | 50 |
| 4 | — | 400 PDTC | 30 | 0.45 μm syringe | 35 | 56 |
| 5 | — | 30 ACXA | 30 | 0.45 μm syringe | 30 | 63 |
| 6 | — | 60 ACXA | 30 | 0.45 μm syringe | 40 | 50 |
| 7 | — | 120 ACXA | 30 | 0.45 μm syringe | 40 | 50 |
| 8 | — | 240 ACXA | 30 | 0.45 μm syringe | 40 | 50 |
| 9 | — | — | * | 0.45 μm syringe | 70 | 13 |
| 10 | 9 | 50 PDTC | 30 | 0.45 μm syringe | 45 | 44 |
| 11 | 9 | 200 PDTC | 30 | 0.45 μm syringe | 35 | 56 |
| 12 | 9 | 30 ACXA | 30 | 0.45 μm syringe | 45 | 44 |
| 13 | 9 | 120 ACXA | 30 | 0.45 μm syringe | 45 | 44 |
| 14 | — | — | * | 100 kDa PES UF | 55 | 31 |

* Sample was not mixed. No flocculant was added. Sample#9 was left to settle overnight.

TABLE 2

Ni removal results from DAF effluent from a grain processing facility wastewater

| Example # | Treatment | Ni Concentration Untreated | Ni Concentration Treated | % Removal |
| --- | --- | --- | --- | --- |
| 1 | Effluent at pH 7.9 + 100 ppm ACXA + 1 ppm flocculant through 0.1 μm PVDF Membrane | 230 | 156 | 32 |
| 2 | Effluent at pH adjusted from 7.9 to 8.9 + 100 ppm ACXA + 1 ppm | 230 | 149 | 35 |

TABLE 2-continued

Ni removal results from DAF effluent from a grain processing facility wastewater

| Example # | Treatment | Ni Concentration Untreated | Treated | % Removal |
|---|---|---|---|---|
| | flocculant + 0.1 μm PVDF Membrane | | | |
| 3 | Effluent at pH 7.6 + 30 ppm ACXA + 0.45 μm PVDF Membrane | 80 | 30 | 63 |
| 4 | Effluent at pH 7.6 + 60 ppm ACXA + 0.45 μm PVDF Membrane | 80 | 40 | 50 |

Table 3 shows results from acrylic-x-alkylamine copolymer comparison to dithiocarbamate polymer with and without filtration for Copper removal from synthetic wastewater.

TABLE 3

Copper removal results from synthetic wastewater

| Sample Number | Treatment Program | Copper, ppm After Settling (Total Cu) | After Filtration through 0.45 μm syringe filter (soluble Cu) |
|---|---|---|---|
| Untreated Program #1 | Untreated Sample | 20 | 20.8 |
| 1 | 300 ppm PDTC | 1.87 | 0.047 |
| 2 | 375 ppm PDTC | 0.158 | 0.01 |
| 3 | 450 ppm PDTC | 1.06 | 0.01 |
| Program #2 | | | |
| 4 | 300 ppm ACXA | 0.655 | 0.245 |
| 5 | 375 ppm ACXA | 0.415 | 0.01 |
| 6 | 450 ppm ACXA | 3.73 | 0.01 |

Total Cu samples were obtained by settling the jar and drawing an aliquot from the top. Soluble samples were obtained by drawing an aliquot and passing it through a 0.45 μm syringe filter. It is clear from the Table 3 that filtration allows significantly higher metal removal than just by settling after dithiocarbamate polymer or acrylic-x-alkylamine copolymer treatment.

Table 4 shows results for mercury removal from power plant FGD wastewater with acrylic-x-alkylamine copolymer and dithiocarbamate polymer with and without filtration. Also the results were compared to the performance of other materials including:

1CP: a first commercially available high molecular weight cationic copolymer of acrylamide and cationic monomer 2CP: a second commercially available high molecular weight cationic copolymer of acrylamide and cationic monomer CA1: a first commercially available copolymer of acrylic acid and acrylamide CA2: a second commercially available copolymer of acrylic acid and acrylamide CA3: a third commercially available copolymer of acrylic acid and acrylamide

TABLE 4

Mercury removal results from power plant FGD wastewater

| Sample Number | Treatment Program | Mercury (ppt) After Settling (Total Hg) | After Filtration (Soluble Hg) |
|---|---|---|---|
| Untreated | Untreated Sample | 136097 | 130735 |
| 1 | 5 ppm 2CP | 117668 | 130922 |
| 2 | 5 ppm 1CP | 124108 | 133774 |
| 3 | 5 ppm CA1 | 127447 | 132889 |
| 4 | 5 ppm CA2 | 131090 | 126352 |
| Program #1 | | | |
| 5 | 30 ppm PDTC | 14224 | 766 |
| 6 | 50 ppm PDTC | 3941 | 211 |
| 7 | 80 ppm PDTC | 2037 | 143 |
| Program #2 | | | |
| 8 | 30 ppm ACXA | 2925 | 623 |
| 9 | 50 ppm ACXA | 2611 | 125 |
| 10 | 80 ppm ACXA | 1187 | 88 |
| Program #3 | | | |
| 11 | pH 8.5, 30 ppm PDTC | 1187 | 190 |
| 12 | pH 8.5, 50 ppm PDTC | 1200 | 152 |
| 13 | pH 8.5, 80 ppm PDTC | 700 | 139 |
| Program #4 | | | |
| 14 | pH 8.5, 30 ppm ACXA | 839 | 172 |
| 15 | pH 8.5, 50 ppm ACXA | 942 | 121 |
| 16 | pH 8.5, 80 ppm ACXA | 691 | 85 |

Total Hg samples were obtained by settling the jar and drawing an aliquot from the top. Soluble samples were obtained by drawing an aliquot and passing it through a 0.45 μm syringe filter. It is clear from the Table 4 that just flocculant treatment (Samples 1-4) removed very little mercury, but dithiocarbamate polymer or acrylic-x-alkylamine copolymer removed significant mercury. Filtration allowed further higher metal removal than just by settling after dithiocarbamate polymer or acrylic-x-alkylamine copolymer treatment. Thus, Tables 3 and 4 showed that lower levels of Cu and mercury were achieved using a 0.45 μm syringe filter in conjunction with dithiocarbamate or acrylic-x-alkylamine copolymer, rather than just the chemistry alone. In some cases, the improvement was by several orders magnitude.

TABLE 5

Selenium Removal from Refinery Wastewater.

| Sample # | Treatment Type | pH | Iron Sulfate (ppm) | Oxidant (ppm) | Selenium Settled (ppm) | Selenium Filtered (ppm) |
|---|---|---|---|---|---|---|
| A | Wastewater as received | 7.6 | — | — | 0.95 | |
| AF | Wastewater as received filtered | 7.6 | — | — | | 0.925 |
| 1 | 25 ppm ACXA | 7.6 | 12 | 500 | 0.755 | 0.87 |
| 2 | 50 ppm ACXA | 7.6 | 25 | 500 | 0.85 | 0.895 |
| 3 | 100 ppm ACXA | 7.6 | 50 | 500 | 0.82 | 0.86 |
| 4 | 150 ppm ACXA | 7.6 | 75 | 500 | 0.89 | 0.92 |
| 5 | 200 ppm ACXA | 7.6 | 100 | 500 | 0.915 | 0.95 |
| 6 | 300 ppm ACXA | 7.6 | 150 | 500 | 0.94 | 0.905 |
| 7 | 25 ppm ACXA | 5.5 | 12 | 250 | 0.275 | 0.165 |
| 8 | 50 ppm ACXA | 5.5 | 25 | 250 | 0.145 | 0.14 |
| 9 | 100 ppm ACXA | 5.5 | 50 | 250 | 0.11 | 0.065 |
| 10 | 150 ppm ACXA | 5.5 | 75 | 250 | 0.09 | 0.05 |
| 11 | 200 ppm ACXA | 5.5 | 100 | 250 | 0.07 | 0.04 |
| 12 | 300 ppm ACXA | 5.5 | 150 | 250 | 0.08 | 0.045 |

Water from a refinery was treated by the process as described in U.S. Pat. No. 8,282,835 B2 (except as adjusted to use ACXA, for example according to the representative examples above) which describes additional methods and/or compositions useful in at least one embodiment of this invention and in particular representative oxidants. The selenium containing water was oxidized and pH adjusted before it was reacted with an iron coagulant and ACXA. The treated water was then allowed to settle and then two samples were drawn-Settled (Samples marked Settled) and Filtered (Samples marked Filtered). The filtering was performed through a 0.45 micron filter. Table 5 shows that combination of oxidation, pH adjustment, metal scavenging polymer, coagulant and filtration allowed selenium removal down to 0.045 ppm from 0.95 ppm. Samples 6-12 also show that filtration allowed higher selenium removal than settling alone.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g., 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of removing one or more metals from a medium containing said metals which comprises the steps of:
   (a) treating said medium containing metals with a composition comprising a copolymer derived from at least two monomers: acrylic-x and an alkylamine,
   (b) passing the treated medium through a filter, and
   (c) collecting said metals;
wherein said acrylic-x has the following formula:

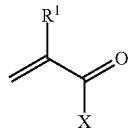

wherein X is OH and salts thereof or $NHR^2$ and wherein $R^1$ and $R^2$ is H or an alkyl or aryl group, wherein the molecular weight of said polymer is between 500 to 200,000, and wherein said polymer is modified to contain a functional group capable of scavenging said medium containing one or more metals.

2. The method of claim 1, wherein the filter is selected from the group consisting of: a sand filter, paper, and any combination thereof.

3. The method of claim 1, wherein the filter is selected from the group consisting of: ultrafiltration, nanofiltration, microfiltration, reverse flow filtration, submerged membrane filtration, reverse osmosis, and any combination thereof.

4. The method of claim 1, wherein said functional group is a dithiocarbamate salt group and wherein said polymer has between 5 to 100 mole % of said dithiocarbamate salt group.

5. The method of claim 1, wherein the acrylic-x is acrylic acid or salts thereof and the alkylamine is pentaethylenehexamine or tetraethylenepetamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 20 mole percent dithiocarbamic acid or salts thereof.

6. The method of claim 1, wherein the acrylic-x is acrylamide and the alkylamine is pentaethylenehexamine or tetraethylenepetamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 20 mole percent dithiocarbamic acid or salts thereof.

7. The method of claim 1, wherein said medium is a process stream containing water.

8. The method of claim 1, wherein the metals are selected from the group consisting of: copper, nickel, zinc, lead, mercury, cadmium, silver, iron, manganese, palladium, platinum, strontium, selenium, arsenic, cobalt, gold, and any combination thereof.

9. The method of claim 1, further comprising an additional treatment of said process stream with a complexing amount of a water soluble ethylene dichloride ammonia polymer having a molecular weight of from 500 to 100,000 which contains 5 to 80 mole % of dithiocarbamate salt groups to form a complex of these metals.

10. The method of claim 1 wherein said polymer treatment occurs at a temperature at or below 300° C.

11. The method of claim 1 wherein the copolymer further comprises a fluorescent group.

12. The method of claim 1, wherein said medium is treated with oxidant first before treatment with scavenging polymer.

13. The method of claim 1, wherein said medium is pH adjusted first before treatment with scavenging polymer.

14. The method of claim 1, wherein said medium is treated with another coagulant before, together or after treatment with scavenging polymer.

15. A method of removing one or more metals from water containing said metals which comprises the steps of:
   (a) treating said water containing metals with a composition comprising a copolymer derived from at least two monomers: acrylic-x and an alkylamine,
   (b) passing the treated water through a filter, and
   (c) collecting said metals;
wherein said acrylic-x has the following formula:

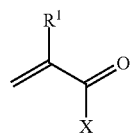

wherein X is OH and salts thereof or $NHR^2$ and wherein $R^1$ and $R^2$ is H or an alkyl or aryl group, wherein the molecular weight of said polymer is between 500 to 200,000, and wherein said polymer is modified to contain a functional group capable of scavenging said medium containing one or more metals;
and wherein mixing conditions between the one or more metals and the composition are such that they form agglomerations of copolymer-metal complexes having a size distribution such that a majority of the complexes could not be collected but for the filter.

16. The method of claim 15, wherein the filter comprises a membrane through which the water passes and the mixing occurs only during a duration of time that is too short for agglomerations of copolymer-metal complexes to form which are larger than the pore size of the membrane.

* * * * *